(12) United States Patent
Frenal et al.

(10) Patent No.: US 10,344,871 B2
(45) Date of Patent: Jul. 9, 2019

(54) TAP FOR PRESSURIZED FLUID

(71) Applicant: L'Air Liquide, Société Anonyme pour l'Etude et l'Exploitation des Procédés Georges Claude, Paris (FR)

(72) Inventors: Antoine Frenal, Ezanville (FR); Olivier Ondo, Rosny sur Seine (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 15/449,232

(22) Filed: Mar. 3, 2017

(65) Prior Publication Data

US 2017/0254420 A1 Sep. 7, 2017

(30) Foreign Application Priority Data

Mar. 3, 2016 (FR) ..................... 16 51799

(51) Int. Cl.
*F16K 31/60* (2006.01)
*F16K 1/30* (2006.01)
*F17C 13/04* (2006.01)

(52) U.S. Cl.
CPC ............ *F16K 1/304* (2013.01); *F16K 31/602* (2013.01); *F17C 13/04* (2013.01); *F17C 2201/032* (2013.01); *F17C 2201/056* (2013.01); *F17C 2201/058* (2013.01); *F17C 2205/013* (2013.01); *F17C 2205/0126* (2013.01); *F17C 2205/035* (2013.01); *F17C 2205/0308* (2013.01); *F17C 2205/0329* (2013.01); *F17C 2205/0338* (2013.01); *F17C 2223/0123* (2013.01); *F17C 2270/0745* (2013.01)

(58) Field of Classification Search
CPC ............ Y10T 137/612; Y10T 137/613; Y10T 137/7065; F16K 1/304; F16K 31/602; F16K 31/522; F16K 31/524; F16K 31/52458; F16K 31/52; F17C 2205/0308; F17C 2205/0329; F16L 55/1157
USPC .......................... 137/317, 320, 382.5; 251/98
See application file for complete search history.

(56) References Cited

U.S. PATENT DOCUMENTS 3,035,605 A * 5/1962 Ninnelt ................... F16K 1/302
137/382
3,881,643 A * 5/1975 LaVange .............. B65D 47/305
222/505

(Continued)

FOREIGN PATENT DOCUMENTS

FR 2 735 209 12/1996
FR 2 828 922 2/2003

*Primary Examiner* — Matthew W Jellett
(74) *Attorney, Agent, or Firm* — Elwood L. Haynes

(57) ABSTRACT

Tap for pressurised fluid, with or without integrated pressure regulator, including a body housing a fluid circuit having an upstream end to be connected to a pressurised fluid reservoir and a downstream end to be connected to a user device, the circuit including a valve for controlling the flow rate in the circuit, the valve being controlled by a lever pivotally mounted on the body of the tap between a first state rest position and a second state active position wherein, the outer surface of the tap comprises a groove and in that, in its first position, a first portion of the lever is housed in the groove and does not protrude or protrudes slightly with respect to the outer surface of the tap, while a second portion or the lever protrudes outside the groove.

9 Claims, 2 Drawing Sheets

(56) References Cited

U.S. PATENT DOCUMENTS

| | | | | |
|---|---|---|---|---|
| 4,718,569 | A | * | 1/1988 | Swanson ................. F17C 13/06 220/212 |
| 5,975,121 | A | | 11/1999 | Arzenton et al. |
| 6,119,718 | A | * | 9/2000 | Cappuccio .............. F16L 35/00 137/317 |
| D786,397 | S | * | 5/2017 | Frenal .......................... D23/206 |
| 2004/0231729 | A1 | * | 11/2004 | Lang ....................... F16K 1/306 137/557 |
| 2008/0223473 | A1 | * | 9/2008 | Palmer ................ F16L 55/1157 138/96 T |
| 2010/0155405 | A1 | | 6/2010 | Lang et al. |
| 2015/0211671 | A1 | * | 7/2015 | Oliver ................. F16L 55/1157 138/89 |
| 2016/0047487 | A1 | * | 2/2016 | Spratley ................. F17C 13/04 137/553 |
| 2016/0223119 | A1 | * | 8/2016 | Oliver ................. F16L 55/1157 |
| 2018/0087671 | A1 | * | 3/2018 | Ondo ..................... F17C 13/04 |

\* cited by examiner

TAP FOR PRESSURIZED FLUID

CROSS REFERENCE TO RELATED APPLICATION

This application claims the benefit of priority under 35 U.S.C. § 119 (a) and (b) to French Patent Application No. 1651799 filed Mar. 3, 2016, the entire contents of which are incorporated herein by reference.

BACKGROUND

The invention relates to a tap for pressurised fluid.

The invention particularly relates to a tap for pressurised fluid, with or without an integrated pressure regulator, comprising a body housing a fluid circuit having an upstream end to be connected to a pressurised fluid reservoir and a downstream end intended to be connected to a user device, the circuit comprising a flow rate control valve, the valve being controlled by a lever pivotally mounted on the body of the tap between a rest position in which the valve is maintained in a first state corresponding to a first flow rate value in the circuit and a second active position in which the lever moves the valve in a second state corresponding to a second flow rate value in the circuit.

Documents FR2828922A1 and FR2735209 disclose examples of taps comprising an isolation valve actuated by a pivoting lever.

When this type of tap is housed in a protective cap, it limits the risk of accidental or inadvertent operation of the lever.

However, when the tap is located in a less protective cap, this risk of accidental movement of the lever increases.

These taps must also be perfected and particularly with regard to compactness and/or ergonomic operation.

SUMMARY

A purpose of the present invention is to overcome all or part of the aforementioned drawbacks of the prior art.

To this end, the tap according to the invention, otherwise in accordance with the generic definition given in the preamble above, is essentially characterised wherein the outside surface of the tap comprises a groove and wherein, in its first position, a first portion of the lever is housed in the groove and does not protrude or protrudes slightly with respect to the outer surface of the tap while a second portion of the lever protrudes outside the groove.

Furthermore, embodiments of the invention may comprise one or more of the following characteristics:
- at least one among the following: the first or the second portion of the lever is rectilinear and/or bent and/or curved,
- in the operating configuration, the outer surface of the tap comprises an upper surface and a lateral surface, the groove being formed on the lateral surface and/or on the upper surface,
- the first portion of the lever is bent and is received in the groove which extends over the upper surface and over the lateral surface of the tap,
- the dimensions and shape of the groove that mate with the dimensions and shape of the portion of the lever that it receives,
- the first and second portions of the lever are connected at an angle so as to form an elbow,
- the lever is articulated on the tap at a first end, said first end being located at the end opposite the second portion of the lever,
- the outer envelope is movably mounted on the body of the tap,
- the outer envelope is movably mounted in translation on the body of the tap between a first and a second position, during its travel between the first and second positions, the groove sliding in relation to the lever, when the lever is in its first position, the lever remaining at least partly housed in the groove while the envelope moves,
- the mobile outer envelope comprises a tubular sleeve,
- the tap comprises a mounting end comprising mobile fastening members intended to cooperate with complementary fastening members to form a quick connect system to attach the tap to a gas source or a circuit and wherein the mobile outer envelope is a locking and/or unlocking member of the mobile fastening members,
- the mobile fastening members comprise balls or claws and wherein, in its first position, the outer envelope does not block the movement of the mobile fastening members and, in its second position, the outer envelope blocks the movement of the mobile members.

The invention also relates to a reservoir or a set of reservoirs of pressurised fluid comprising such a tap.

The invention may also relate to any alternative device or method comprising any combination of the features mentioned above or below.

BRIEF DESCRIPTION OF THE DRAWINGS

Other features and advantages will become more apparent from the following description when taken in conjunction with the accompanying drawings in which.

DESCRIPTION OF PREFERRED EMBODIMENTS

Figure 1:
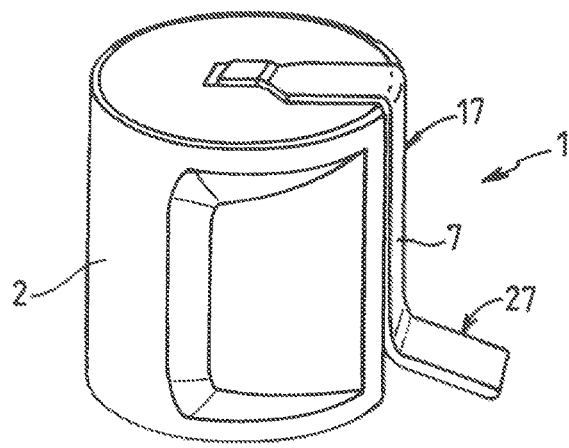
FIG. 1 is a schematic and partial perspective view illustrating an example of the tap according to the invention.
Figure 2:
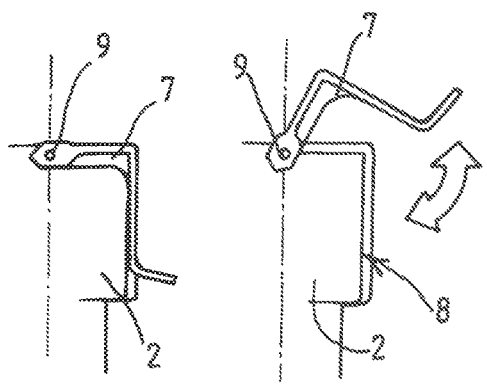
FIG. 2 is a schematic and partial cross-sectional view of the tap of FIG. 1 in two distinct configurations (distinct positions of its lever)
Figure 3:
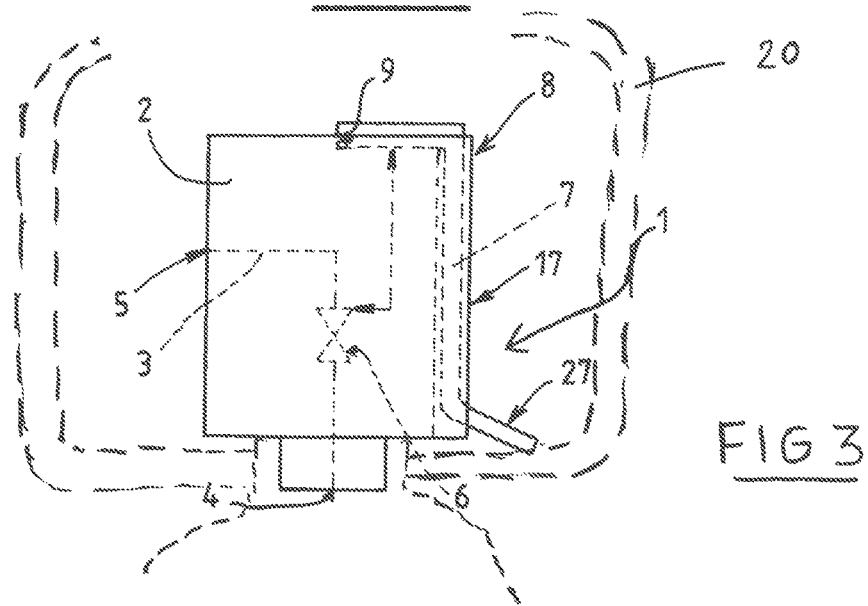
FIG. 3 is a schematic and partial side view illustrating another example of an embodiment of a tap according to the invention.

The tap 1 shown in FIGS. 1 to 3 comprises a body 2 conventionally housing a fluid circuit 3 having an upstream end 4 intended to be connected to a pressurised fluid reservoir (a cylinder or a set of cylinders, for example) and a downstream end 5 intended to be connected to a device using gas supplied by the pressurised fluid reservoir.

The circuit 3 conventionally comprises a valve 6 for controlling the flow rate in the circuit 3. This valve 6 can be an isolation valve for opening or closing the circuit 3 and/or a valve for adjusting a flow rate or a pressure or any other type of appropriate valve.

The valve 6 is controlled by a lever 7 pivotally mounted on the body 2 of the tap 1 (on, for example, at least one articulation 9). For example, the lever 7 is articulated at one of its ends, for example on the upper portion of the body 2 of the tap 1.

The lever 7 is movable between a rest position (left part of FIG. 1) wherein the valve 6 is maintained in a first state corresponding to a first flow rate value in the circuit 3 (for example zero flow) and a second active position (right part of FIG. 2) wherein the lever 7 moves the valve 6 into a second state corresponding to a second flow rate value in the circuit 3 (for example, circuit fully open for a maximum flow rate).

The flow rate control member 6 in the circuit 3, shown in the figures, comprises a valve 6, although any other flow rate control member 6 could be considered.

For example, alternatively or in combination, the tap 2 could comprise a mobile part such a valve actuator, the movement of which is controlled by the lever 7. This valve actuator, mobile in translation for example, can be provided for example to actuate (notably to open) a system of valves located on another tap or a cylinder on which the tap has just been connected in order to extract or transfer pressurised fluid.

According to an advantageous feature, the outer surface of the tap 1 comprises a groove 8 and, in its first position, a first portion 17 of the lever 7 is housed in the groove 8 and does not protrude or protrudes slightly with respect to the outer surface of the tap 1. A second portion 27 of the lever 7 (preferably the terminal gripping end) protrudes outside the groove 7.

When the lever 7 leaves its first position (notably in its second position), the first portion 17 exits the groove and protrudes in relation to the outer surface of the body of the tap. Preferably, the second portion 27 of the lever also protrudes (see FIG. 2).

The first portion 17 of the lever 7 does not protrude or protrudes slightly in relation to the outer surface of the tap 1, meaning for example that this portion 17 of the lever is integrated into the volume of the tap. That is to say that this portion 17 of the lever 7 is not or barely visible when the tap 1 is viewed from the side and this portion 17 is not accessible manually (or with difficulty). That is to say that this portion of the lever is flush or is recessed or slightly projecting with respect to the outer surface of the tap. For example, the second portion 17 protrudes from the groove 8 over a distance of less than half its thickness.

In its first position, the lever 7 is, for example, bearing on or in abutment against the bottom of the groove 8.

As shown in the figures, the first 17 and the second portion 27 of the lever 7 can be rectilinear. Of course, these portions 17, 27 of the tap could be bent and/or curved.

In the operating configuration, the outer surface of the tap 1 comprises for example a substantially horizontal upper surface and a substantially vertical lateral surface. In the non-limiting example illustrated in the figures, the groove 8 can be formed at the lateral surface and at the upper surface. That is to say that the first portion 17 of the lever 7 is bent and is received in the groove 8 which extends over the upper surface and over the lateral surface of the tap 1.

Figure 6:
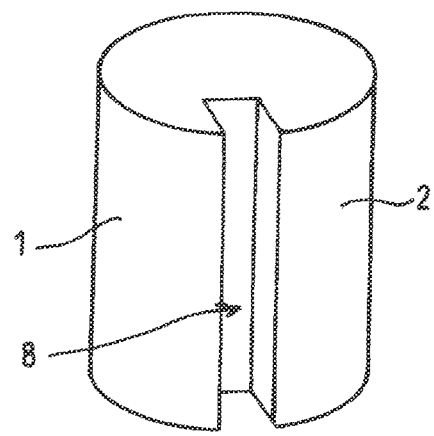
FIG. 6 is a schematic and partial perspective view illustrating a detail of the structure of an example of the tap according to the invention.

Preferably, the dimensions and shape of the groove 8 mate with the dimensions and shape of the portion 17 of the lever 7 that it receives. That is to say the lever 7 fits into its groove 8 (also see FIG. 6).

In addition, the first 17 and second 27 portions of the lever 7 can be connected at an angle so as to form an elbow so that the terminal end of the lever 7 protrudes outside the groove 8 towards the exterior to facilitate and locate the gripping area of the lever. This access area is located and limited and thereby reduces the risk that the lever can be accidentally hooked and moved into its second position.

Figure 4:
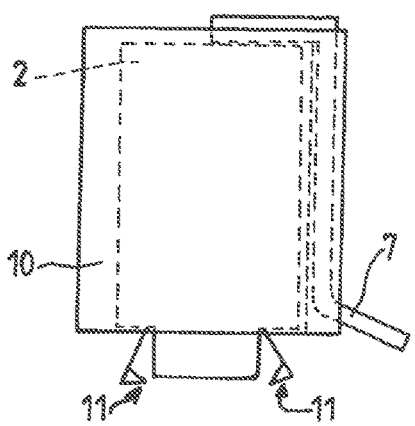
FIG. 4 is a schematic and partial side view illustrating another example of an embodiment of a tap according to the invention in a first configuration.
Figure 5:
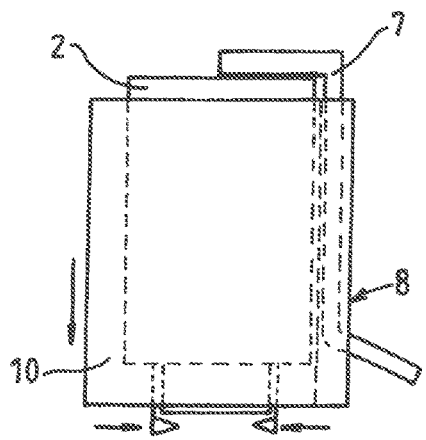
FIG. 5 shows the tap of FIG. 4 in a similar view and according to a second configuration.

In the embodiment example shown in FIGS. 4 and 5, the tap comprises an exterior envelope 10 secured to the outer surface of the body 2 of the tap 1 and the groove 8 is formed at least partly in this envelope 10. This envelope 10 can be a shell having a protective function and/or an aesthetic function and/or another feature.

In particular, and as illustrated in FIGS. 4 and 5, the outer envelope 10 can be movably mounted on the body 2 of the tap 1.

For example, the outer envelope 10 is movably mounted in translation and/or in rotation (and/or in another manner, where appropriate) on the body 2 of the tap 1. In the example of the figures, the envelope 10 is movable between a first and a second position (see FIGS. 4 and 5). For example, this movement is a translation parallel to the vertical axis of the tap 1 (up/down direction). During its travel between the first and second positions, the groove 8 can thus slide along/about the lever 7. Preferably, when the lever 7 is in its first position, the lever 7 remains at least partly housed in the groove 8 while the envelope 10 moves.

The mobile, manually movable outer envelope 10 can comprise or include a tubular sleeve.

In one possible embodiment shown in FIGS. 4 and 5, the tap comprises a mounting end 11 provided with mobile fastening members intended to cooperate with complementary fastening members to form a quick connect system of the tap 1 on a gas source (or a circuit).

The mobile fastening members 11 include, for example, a system with balls and/or claws and/or pins.

The mobile outer envelope 10 can be a locking and/or unlocking member of the manually operable or automatic mobile fastening members 11.

That is to say that, according to its position, the envelope 10 locks or unlocks the connection of the tap 1 on an accessory (another tap integral with a gas cylinder, for example).

For example, in its first position (high position, for example, see FIG. 4) the outer shell 10 does not block the movement of the mobile fastening members 11 and, in its second position (low position, see FIG. 5), the outer envelope 10 blocks (locks) the travel of the mobile members 11.

The outer shell 10 thereby enables the integration of several functions and participates in the compactness and in ergonomics of the tap 1.

The invention claimed is:

1. A tap for pressurised fluid, comprising a body (2) housing a fluid circuit (3) having an upstream end (4) intended to be connected to a pressurised fluid reservoir and a downstream end (5) intended to be connected to a user device, the circuit (3) comprising a valve (6) for controlling a flow rate in a circuit (3), the valve (6) being controlled by a lever (7) pivotally mounted on the body (2) of the tap (1) between a rest position in which the valve (6) is maintained in a first state corresponding to a first flow rate value in the circuit (3) and a second active position in which the lever (7) moves the valve (6) in a second state corresponding to a second flow rate value in the circuit (3), wherein the outer surface of the tap (1) comprises a groove (8) having a bottom in the radial direction, and wherein, in a first position, a first portion (17) of the lever (7) is housed in the groove (8) an in abutment against the bottom of the groove, and does not protrude with respect to the outer surface of the tap (1), while a second portion (27) of the lever (7) protrudes outside the groove (7) and wherein, when the lever (7) exits the first position, the first portion exits the groove (8) and protrudes in relation to the outer surface of the body of the tap, and further comprising an outer envelope (10) fitted onto the outer surface of the body (2) of the tap (1) and wherein the groove (8) is formed at least in part in said envelope (10), wherein the outer envelope (10) is movably mounted in translation on the body (2) of the tap (1) between a first translation position and a second translation position and wherein, during the travel between the first translation position and second translation positions, the groove (8) slides relative to the lever (7), and wherein, when the lever (7) is in the first translation position, the lever (7) remains at least partly housed in the groove (8) while the envelope (10) moves.

2. The tap of claim 1, wherein at least one of the following:
the first (17) or the second (27) portion of the lever (7) is rectilinear and/or bent and/or curved.

3. The tap of claim 1, wherein in operating configuration, the outer surface of the tap (1) comprises an upper surface and a lateral surface and wherein the groove (8) is formed on the lateral surface and/or on the upper surface.

4. The tap of claim 3, wherein the first portion (17) of the lever (7) is bent and is received in the groove (8) which extends over the upper surface and over the lateral surface of tap.

5. The tap of claim 1, wherein the first (17) and second (27) portions of the lever (7) are connected at an angle so as to form an elbow.

6. The tap of claim 1, wherein the lever (7) is articulated (9) on the tap (1) at the first end, said first end being located on the end opposite the second portion (27) of the lever (7).

7. The tap of claim 1, wherein the outer envelope (10) is movably mounted on the body (2) of the tap (1).

8. The tap of claim 1, further comprising a mounting end comprising mobile fastening members (11) intended to cooperate with complementary fastening members to form a quick connect system to attach the tap (1) to a gas source or a circuit and wherein the outer envelope (10) is a locking and/or unlocking member of the mobile fastening members (11).

9. A pressurised fluid cylinder comprising a pressurised fluid tap according to claim 1, wherein the cylinder has a protective cap (20) mounted on the cylinder and forming a protection around the tap.

\* \* \* \* \*